United States Patent
Narvaez

(10) Patent No.: US 9,643,114 B2
(45) Date of Patent: *May 9, 2017

(54) ELASTIC COMPONENT PROVIDING INDICATION OF PROPER INSTALLATION

(71) Applicant: DV Industries, LLC, Forth Worth, TX (US)

(72) Inventor: Jorge Alejandro Narvaez, Fort Worth, TX (US)

(73) Assignee: DV Industries, LLC, Rowlett, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,927

(22) Filed: Aug. 30, 2016

(65) Prior Publication Data

US 2016/0375381 A1 Dec. 29, 2016

Related U.S. Application Data

(60) Continuation of application No. 14/977,527, filed on Dec. 21, 2015, now Pat. No. 9,463,401, which is a
(Continued)

(51) Int. Cl.
*G01L 5/24* (2006.01)
*B01D 35/143* (2006.01)
(Continued)

(52) U.S. Cl.
CPC ........... *B01D 35/143* (2013.01); *B01D 27/08* (2013.01); *B01D 29/96* (2013.01); *B01D 35/005* (2013.01); *B01D 35/14* (2013.01); *B01D 35/306* (2013.01); *F01M 11/03* (2013.01); *G01L 3/00* (2013.01); *G01L 5/24* (2013.01); *B01D 35/30* (2013.01); *B01D 2201/24* (2013.01); *B01D 2201/301* (2013.01); *B01D 2201/304* (2013.01); *B01D 2201/305* (2013.01); *B01D 2201/40* (2013.01); *B01D 2201/4023* (2013.01); *B01D 2201/4076* (2013.01); *B01D 2201/4084* (2013.01); *B01D 2201/4092* (2013.01)

(58) Field of Classification Search
CPC ............ B01D 2201/25; B01D 2201/40; B01D 2201/301; B01D 2201/305; B01D 2201/4023; B01D 2201/4076; B01D 2201/4084; B01D 35/30; B01D 35/306
USPC ........ 210/85, 91, 238, 440, 443, 455; 411/8, 411/10, 11, 353; 73/761, 862.21, 73/862.391, 862.53

See application file for complete search history.

(56) References Cited

U.S. PATENT DOCUMENTS 7,493,810 B2 * 2/2009 Walczyk ................... G01L 1/04
200/1 B
7,934,617 B2 * 5/2011 Minowa ................. B01D 29/21
210/232

(Continued)

*Primary Examiner* — Jonathan Dunlap
(74) *Attorney, Agent, or Firm* — Timothy G. Ackermann

(57) ABSTRACT

An apparatus having a bottom assembly with a fitting for interfacing to connect the bottom assembly to a second structure, having an elastic element that, when sufficient force is applied via the process of mating the bottom assembly to the second structure, and at an appropriate pressure value, passes from a first stable position, through a threshold, and to a second position, creating a tactile or audible indication that the apparatus has been properly installed.

22 Claims, 5 Drawing Sheets

Related U.S. Application Data division of application No. 14/271,721, filed on May 7, 2014, now abandoned.

(51) Int. Cl.
*G01L 3/00* (2006.01)
*B01D 27/08* (2006.01)
*F01M 11/03* (2006.01)
*B01D 35/00* (2006.01)
*B01D 35/14* (2006.01)
*B01D 29/96* (2006.01)
*B01D 35/30* (2006.01)

(56) References Cited

U.S. PATENT DOCUMENTS

| | | | | |
|---|---|---|---|---|
| 2002/0076296 | A1* | 6/2002 | Dunfee | F16B 31/028 411/8 |
| 2007/0034631 | A1* | 2/2007 | Minowa | B01D 29/21 220/298 |
| 2008/0041169 | A1* | 2/2008 | Walczyk | G01L 1/04 73/862.391 |
| 2011/0308062 | A1* | 12/2011 | Tharp | B60K 15/0406 29/453 |
| 2012/0261323 | A1* | 10/2012 | Badeau | B01D 27/08 210/232 |
| 2013/0233053 | A1* | 9/2013 | Beemer | B01L 3/563 73/23.35 |
| 2014/0183119 | A1* | 7/2014 | Brown | B01D 35/30 210/238 |

\* cited by examiner

ELASTIC COMPONENT PROVIDING INDICATION OF PROPER INSTALLATION

CROSS-REFERENCE TO RELATED APPLICATIONS

The present application claims priority to U.S. patent application Ser. No. 14/977,527, filed Dec. 21, 2015 and, through that application, to U.S. patent application Ser. No. 14/271,721, filed May 7, 2014 (now abandoned), and those applications are incorporated by reference in their entirety.

BACKGROUND OF THE INVENTION

Oil filters play a central role in protecting the engine within all automotive vehicles. A filter ensures optimum oil supply, especially during cold starts when oil viscosity is at its greatest. Over time the engine oil circuit becomes contaminated by combustion residue, metal shavings and other particles. To remove these pollutants engine oil is pumped into the oil filter where it is then passed through a pleated filtering medium designed to remove impurities down to the micron level. Once the engine oil is filtered through the pleated filtering medium, it then flows back into the oil pump where it is then sent to the engine. Oil filters are intended to be changed periodically, as the pleated filtering medium accumulates particulate debris suspended in the engine oil over time due to normal usage. While tightening an oil filter on a mounting base, one may be uncertain about the exact amount of torque required to securely tighten the oil filter to the mounting base of an engine block. Tightening it too much may cause damage to the oil filter, specifically the sealing ring, which may deform and allow pressurized oil to leak out. Not tightening it enough may also result in leaks, which may cause extensive damage to the engine due to oil starvation and subsequent overheating. Accordingly, it would be beneficial in the art if there were a tangible (e.g., audible) indication to the person installing the filter that the right amount of torque has been used and that the filter is properly secured and neither too tightly nor too loosely attached. Furthermore, visual, tactile, and/or audible indicators of sufficient levels of torque could be useful outside the context of an oil filter, such as in tire lug nuts or other nonautomotive applications such as bottle caps which change shape when the contents is spoiled.

SUMMARY OF THE INVENTION

The method described herein consists of a diaphragm, or other surface, which has material elasticity and bi-stability. Materials engineered in this fashion and may bend and or emit a sound or vibration when a predetermined amount of torque or force is applied (hereafter, indication). This indication denotes the required torque has been applied signifying the widget is installed properly. The surface displaced by the torque being applied can be of different configurations. This surface may be convex, concave, flat with a central or distal portion shaped in the needed fashion to cause it to emit an indication that a predetermined torque has been applied. The mechanism by which the surface emitting the indication is referred to as snap-through buckling. This is a phenomenon that occurs on loading of a panel, when the panel resistance suddenly decreases with increasing imposed deflection. In some instances, the drop-in load is accompanied by the release of a sound. Once the surface has been engineered to displace at a predetermined load, the end user, be it a manufacturer or DIY person at home, can be assured of consistent torque between two mating surfaces without having to use devices, which require proper use and calibration. Prior to this method, the most common tools for torquing are torque wrenches, which are available in several types. Some of these types are slipper, beam, deflecting beam, click, electronic and mechatronic. Regardless of the type of torque wrench used they all need a certain amount of knowledge and proper use by the operator to yield a consistent and valid torque onto whatever is being installed. For instance, torque wrenches, like the click, electronic or mechatronic types, require recalibration as part of their periodic maintenance. Further, when not in use, some types require a certain amount of tension while in storage to preserve the calibration of their internal components. As one example of the use of the method, the application described herein demonstrates the usefulness of the method in a setting where tight or confined spaces make the use of a torque wrench very difficult. In this instance, we refer to the modification of oil filters, used in a myriad of motive applications, so that properly consistent installation can be achieved without requiring the use of torque measuring devices.

BRIEF DESCRIPTION OF THE DRAWINGS

FIG. 4 is a vertical cross section of an Oil Filter coupled to an Engine Block according to a system and method of present disclosure.

DETAILED DESCRIPTION OF THE DRAWINGS

An oil filter having a mechanism for delivering a physical (e.g., audible or tactile) indication to the user that the filter is tightly secured and should not be further tightened, is disclosed. Turning now to the figures, where like numerals refer to like elements.

Figure 1:
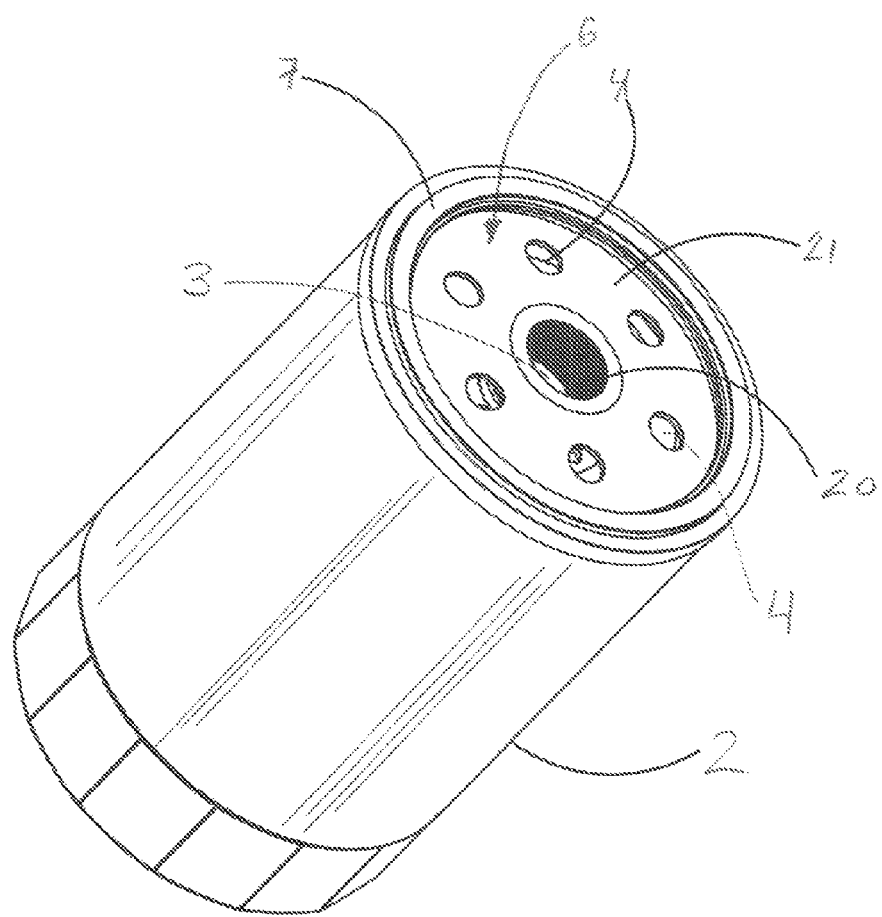
FIG. 1 is a perspective view of an Oil Filter according to a system and method of the present disclosure.

FIG. 1 is a perspective view of an Oil Filter according to one aspect of the present invention. The center surface of Bottom Assembly 6 may have a female thread 20 for threading the Oil Filter 2 to Mounting Base 1 which female thread 20 is defined as an Outflow Hole 3 for passage of filtered engine oil back into the engine. Around the central Outflow Hole 3 there may be several Inflow Holes 4 on the exterior surface of Bottom Assembly 6 through which dirty engine oil may enter from the engine into Oil Filter 2. The center surface 21 of Bottom Assembly 6 may displace pressure through mechanical hoop strength. Hoop strength is a mechanical property that may apply to flattened surfaces. It may appear on said surface in the form of a ring 22. This ring contains and directs all applied force to the edges of the ring. If said surface 21 also displays material elasticity and bi-stability, then the force applied while threading on Oil Filter 2 may cause the surface to revert to its opposite state.

Bi-stability allows the Bottom Assembly 6 to live in two stable "minima" states which are stable due to minimal pressure applied to the component. Bi-stable components also have a third state, called the "maximum" state. The maximum state lies in between the two minima states and is a direct result of the pressure applied while threading Oil Filter 2 onto Mounting Base 1. When enough pressure is applied, Bottom Assembly 6 will go from one minima state, through the maximum state and regain stability in the other minima state.

Figure 2:
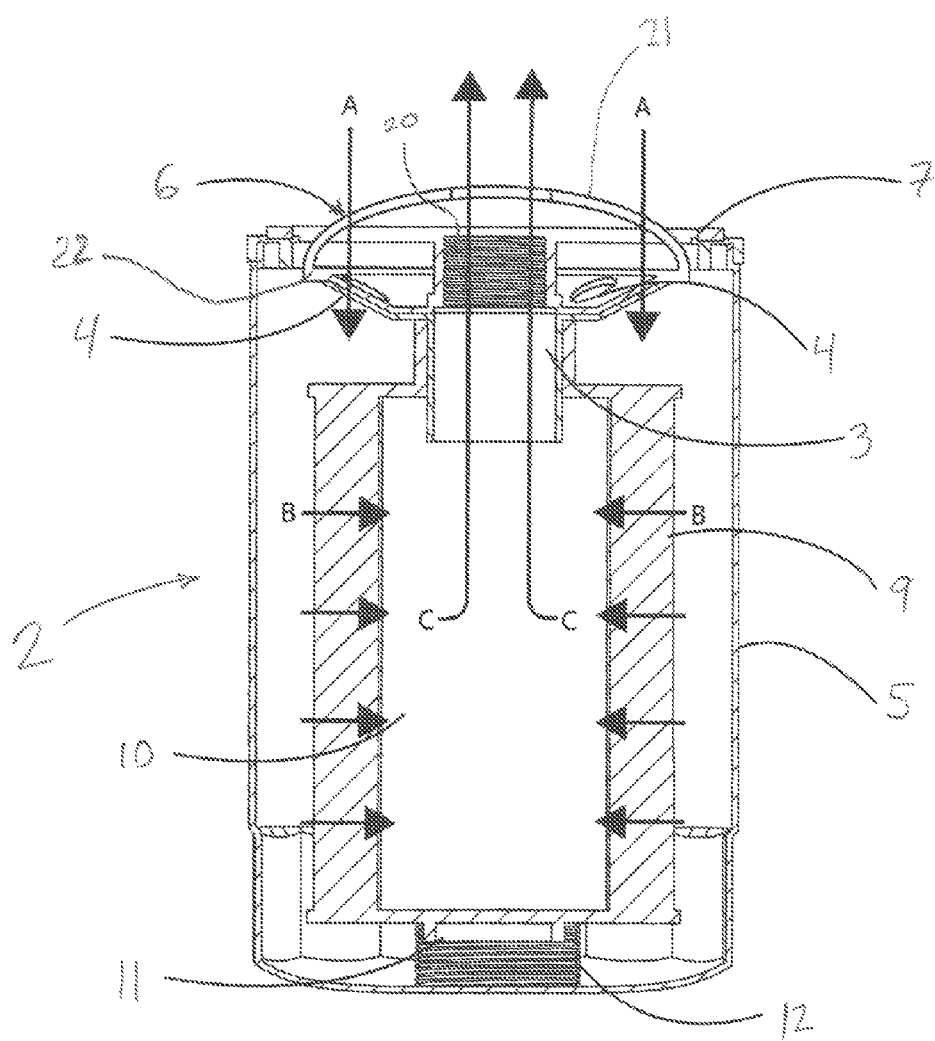
FIG. 2 is a vertical cross section of an Oil Filter showing the direction and flow of oil according to a system and method of present disclosure.

According to FIG. 2, Oil Filter 2 consists of Filter Housing 5, Bottom Assembly 6, Sealing Ring 7, Anti-Drain Valve (not shown), Pleated Filtering Medium 9, Center Tube 10, Outflow Hole 3, Inflow Hole 4, Bypass Valve 11, and Relief Spring 12. Filter Housing 5 may be may stamped, die cast or injection molded out of plastic, steel, aluminum or any rigid medium capable of enclosing the components within Filter Housing 5. As shown in FIG. 2, Filter Housing 5 may contain Pleated Filtering Medium 9, which has two main functions; removing particulate residue from the engine oil and trapping particulate residue within the medium. Pleated Filtering Medium 9 may be a fabricated mixture of cellulose, cloth, paper, polyester fiber or any porous material that may possess the ability to trap and contain dirt and other residual material inside of it.

FIG. 2 is a vertical section view of Oil Filter 2 showing the direction and flow of engine oil (shown as Arrow A, B and C) according to a system and method of present disclosure. According to an aspect of the present disclosure, direction of Arrow A may display how engine oil is pumped into Oil Filter 2 through Inflow Holes 4. The engine oil enters into Oil Filter 2 through Inflow Holes 4 and then may pass through Pleated Filtering Medium 9, as displayed in the direction of Arrow B. Filtered engine oil is then collected in Center Tube 10 and pumped back into the engine through Outflow Hole 3, as displayed in the direction of Arrow C. Anti-Drain Valve (not shown) may be a one way check valve that allows filtered engine oil to flow from Oil Pump into Oil Filter 2 while the engine is running. In one aspect, Anti-Drain Valve (not shown) may be open to allow for engine oil to flow when the engine is running. Anti-Drain Valve (not shown) may close to keep the engine and Oil Filter 2 passages lubricated when the engine is shut off.

Also shown in FIG. 2, Bypass Valve 11 may be fitted beneath of Center Tube 10 within Oil Filter 2. Bypass Valve 11 may be utilized to increase engine oil flow and engine oil pressure when the temperature of the engine oil falls below its standard operating temperature. In this aspect the viscosity of the engine oil may increase, which decreases the engine oil's ability to flow freely through the engine and Oil Filter 2. If the engine oil falls below its standard operating temperature, Bypass Valve 11 may open and increase engine oil flow. As the engine and engine oil warms up, Bypass Valve 11 may close to regulate the engine oil pressure inside Oil Filter 2. When Oil Filter 2 reaches its full capacity it may lose its ability to distribute engine oil through Pleated Filtering Medium 9, in this aspect Bypass Valve 11 opens to regulate oil flow and oil pressure.

Figure 3:
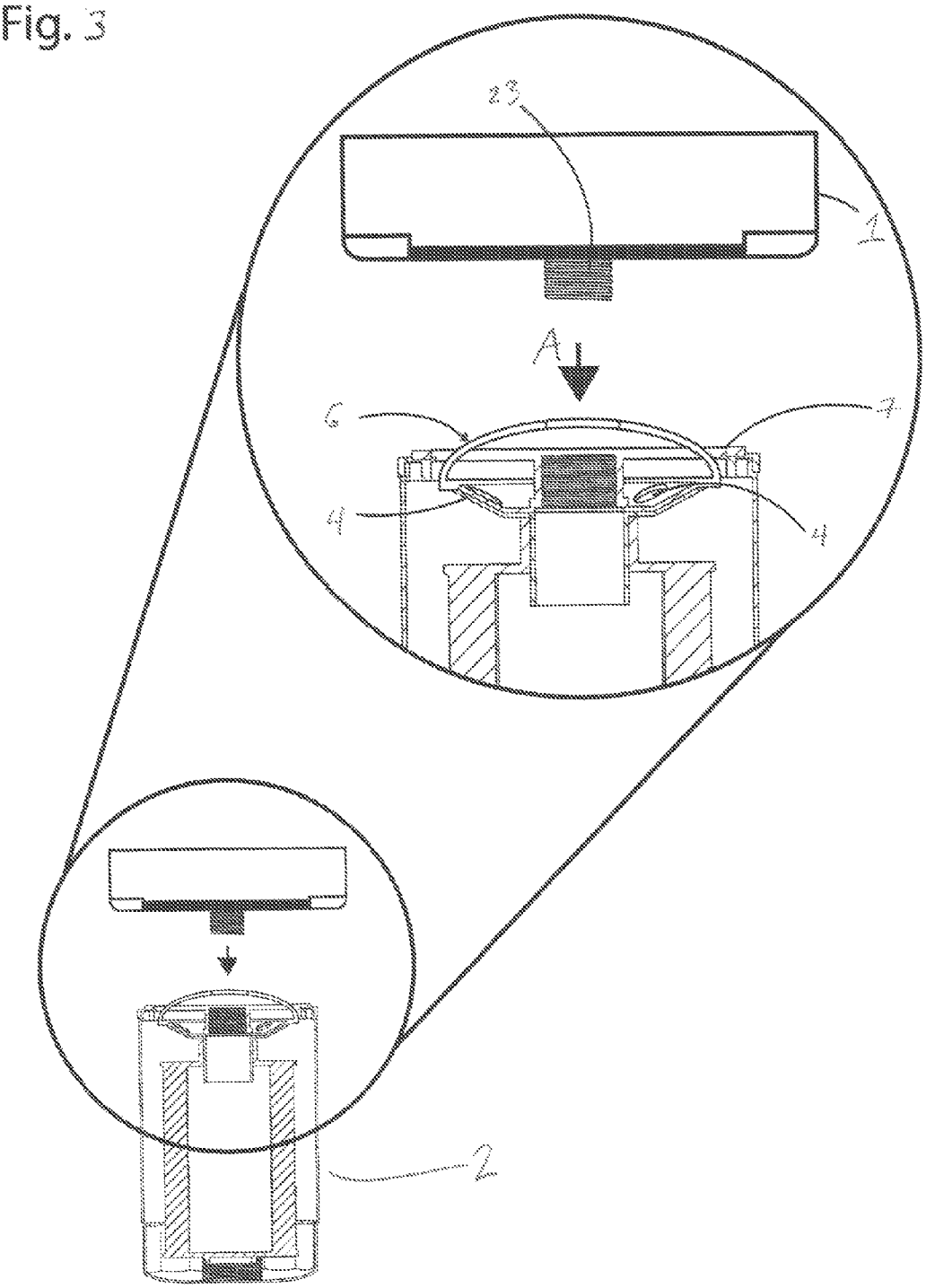
FIG. 3 is a vertical cross section of an Oil Filter prior to being coupled to an Engine Block according to a system and method of present disclosure.
Figure 1:
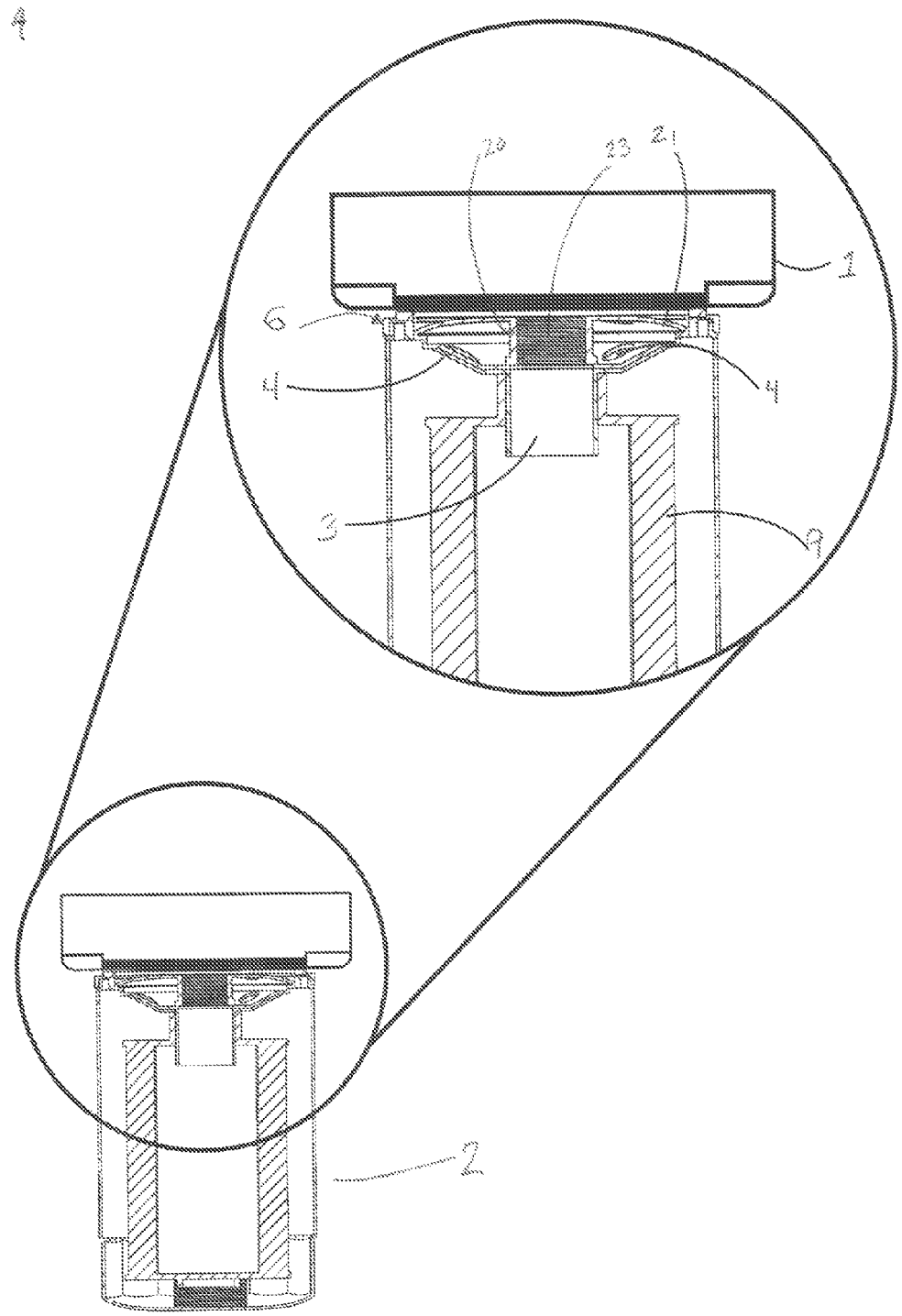

FIG. 3 is a vertical section view of Oil Filter 2 in the expanded position according to a system and method of the present disclosure. Bottom Assembly 6, connected to the bottom of Oil Filter 2, may be constructed of forged metal, steel, aluminum, plastic or any material that may easily be shaped into a hollow dome with bi-stability and material elasticity. When Oil Filter 2 is not connected to Mounting Base 1, Bottom Assembly 6 may be in the expanded position. As shown in FIG. 3, Bottom Assembly 6 is expanded because there is no pressure or force being applied. Bottom Assembly 6 may replicate the motions exhibited in a diaphragm, expanding when no pressure is applied, and contracting when enough pressure is applied. When completely connected to Mounting Base 1, (as shown in FIG. 4) Bottom Assembly 6 may contract, indicating Bottom Assembly 6 was properly connected to Mounting Base 1. Oil Filter 2 may be threaded 23 on to Mounting Base 1 as shown in the direction of Arrow A.

FIG. 4 is a section view of Oil Filter 2 in the contracted position according to a system and method of the present disclosure. Bottom Assembly 6 may be in a contracted position after being coupled to Mounting Base 1. Once enough pressure is exerted on Bottom Assembly 6 through an appropriate torque value, Bottom Assembly 6 may contract, indicating Bottom Assembly 6 was properly connected to Mounting Base 1. When Bottom Assembly 6 is contracted, User (not shown) may be able to visually identify that Oil Filter 2 has been properly coupled to Mounting Base 1. The contraction of Bottom Assembly 6 may also be identified by an audible sound and or a physical vibration known as snap-through buckling. This is a phenomenon that occurs on loading of a surface 21, when the surface resistance suddenly decreases with increasing imposed deflection. In some instances, the drop-in load is accompanied by an audible "click" or "pop."

Figure 5A:
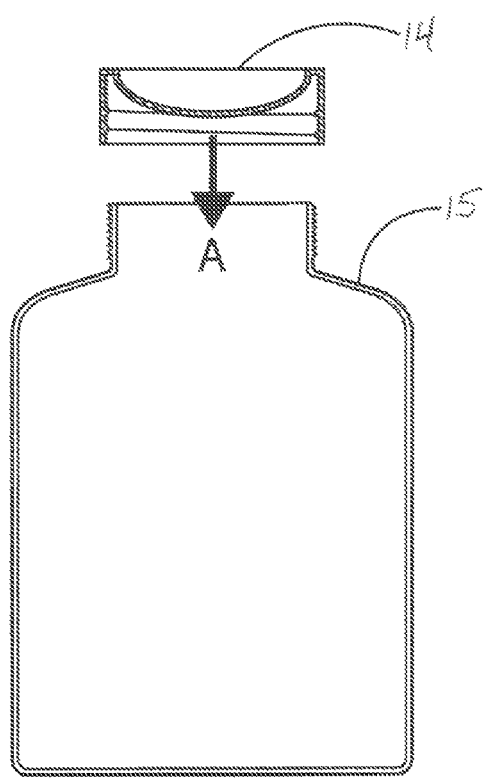
FIG. 5A is a cross section of a bottle cap prior to being sealed onto a bottle according to a system and method of the present disclosure.
Figure 5B:
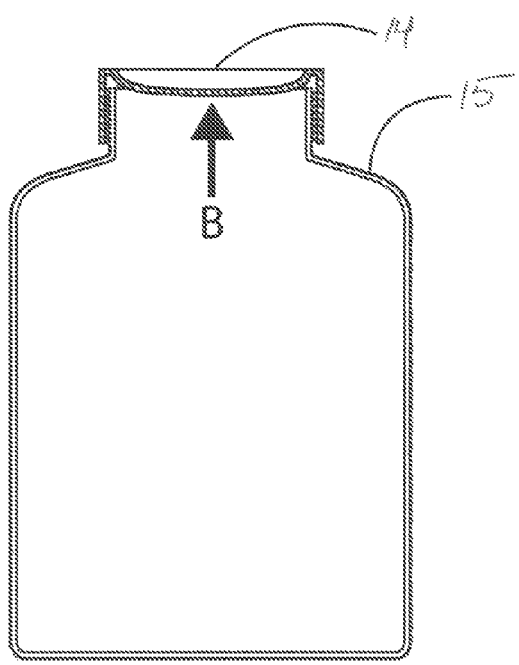
FIG. 5B is a cross section of a bottle cap sealed onto a bottle according to a system and method of the present disclosure.

FIG. 5A and FIG. 5B are section views displaying a bottle cap being screwed onto a threaded bottle. In one aspect of the present disclosure, the mechanisms involved in the expansion and contraction of Bottom Assembly 6 may be applied to objects other than oil filters, thus indicating an appropriate torque value was used to couple one object onto another object. For example, Bottle Cap 14 could utilize the mechanisms explained herein to ensure the Bottle Cap 14 is tightly secured to the rim of a Bottle 15. In this example, when the Bottle Cap 14 is properly secured to the rim of the Bottle 15 as shown in the direction of Arrow A, the Bottle Cap 14 may contract from the expanded position as a result of a force applied on the Bottle Cap 14 from the rim of the Bottle 15 as shown in the direction of Arrow B. As the Bottle Cap 14 contracts from the center, an audible popping noise may be emitted and indicate to the user that an appropriate torque value has been applied to the Bottle 15. In this use case, the Bottle 15 could potentially leak fluid if the Bottle Cap 14 stays in the expanded position.

There are numerous applications for which the mechanisms described herein may be utilized so long as a constant force is applied to the component that expands and contracts. This constant force will cause the mechanism to reach a threshold, thus causing the material to go from an expanded to contracted position. In one non-limiting example, a diaphragm on a tire rim may contract in the same fashion when being mounted on a vehicle. The constant force applied to a nut or bolt, locking a tire rim into place may cause the diaphragm contract, emit an audible pop and indicate to the user that an appropriate torque value has been applied and the tire is properly installed. This mechanism may be applied to any cylindrical container that requires a cylindrical lid.

The pressure needed to activate the expansion or contraction of a component such as Bottom Assembly 6 may be caused by forces other than those manually applied by a user applying force or torque. For example, some gases or fluids may create pressure within a bottle or container based on various factors such as but not limited to exposure to heat, cold, sunlight and additional liquids and gases. For example, Bottle Cap 14 could indicate to a user that the liquid or gas within Bottle 15 is no longer edible, drinkable or usable based on the expansion or contraction of said bottle cap when sealed on a bottle.

The invention claimed is:

1. An oil filter having an engine end and an opposite housing end, comprising:
   a sealing ring;
      said sealing ring having a sealing surface facing the engine end;
   a dome comprising an elastic material;
      said dome comprising a first stable position in which said dome extends past the sealing surface in a direction of the engine end.

2. The oil filter of claim 1,
   said dome further comprising a second position in which said dome extends past the sealing surface in a direction of the housing end; and
   said dome further comprising a threshold between said positions.

3. The oil filter of claim 2,
   said dome creating an indication that a desired force has been applied to said sealing surface while crossing said threshold.

4. The oil filter of claim 2,
   said sealing ring having a desired force applied thereto when said dome is in said second position.

5. The oil filter of claim 1, further comprising a fitting at the engine end;
   said dome defining a hole therethrough; and
   wherein said dome forms an annulus radially encircling the fitting.

6. The oil filter of claim 5,
   said dome further defining holes passing therethrough; and
   said holes located radially inward of said sealing ring and radially outward of the fitting.

7. The oil filter of claim 1,
   said dome further comprising a second position; and
   said dome indicating a desired force has been applied to said sealing surface when said dome is in said second position.

8. The oil filter of claim 1,
   said dome further comprising a second position;
   said dome further comprising a threshold between said positions; and
   said dome creating an indication that a desired force has been applied to said sealing surface while crossing said threshold.

9. An oil filter having an outflow direction and inflow direction, comprising:
   an oil fitting;
   a sealing surface positioned annularly about the fitting; and
   a force indication mechanism comprising;
      a dome having material elasticity, a first stable position and a second position;
      wherein in said first stable position said dome extends in the outflow direction beyond the sealing surface.

10. The oil filter of claim 9,
    wherein in said second position said dome extends in the inflow direction beyond the sealing surface.

11. The oil filter of claim 9,
    said dome further comprising a threshold between said positions.

12. The oil filter of claim 11,
    said indicator mechanism indicating a desired force has been applied to said sealing surface while crossing said threshold.

13. The oil filter of claim 11,
    said indicator mechanism presenting a vibration while crossing said threshold.

14. The oil filter of claim 11,
    wherein in said second position said dome extends in the inflow direction beyond the sealing surface.

15. A method of installing an oil filter comprising:
    connecting a fitting onto a mating fitting on an engine mounting base;
    contacting a sealing surface of the oil filter to said mounting base; and
    operating a force indication mechanism comprising a dome comprising an elastic material and operationally connected to the fitting;
       said operating step comprising contacting said dome to said engine mounting base when said dome is in a first stable position; and
       said operating step further comprising said indicator mechanism creating a vibrational indication that a desired force has been applied to said sealing surface.

16. The method of installing an oil filter of claim 15,
    said operating step further comprising applying sufficient force to said force indication mechanism to cause said dome to pass through a threshold between said first stable position and a second position.

17. The method of installing an oil filter of claim 15,
    said operating step further comprising the step of said dome reaching a second position.

18. The method of installing an oil filter of claim 17,
    wherein in second position said dome is positioned farther from said engine mounting base than said sealing surface.

19. The method of installing an oil filter of claim 15,
    wherein the vibrational indication is audible.

20. The method of installing an oil filter of claim 15,
    wherein said step of contacting the sealing surface to said mounting base follows said step of contacting the dome to said mounting base.

21. The method of installing an oil filter of claim 15,
    said dome further defining holes passing therethrough; and
    said holes located radially inward of said sealing surface and radially outward of the fitting.

22. The method of installing an oil filter of claim 15,
    wherein said dome in said first stable position extends past the sealing surface toward said mounting base.

* * * * *